(12) United States Patent
Tang et al.

(10) Patent No.: US 6,724,322 B2
(45) Date of Patent: Apr. 20, 2004

(54) REMOTE SYSTEM FOR PROVIDING VEHICLE INFORMATION TO A USER

(75) Inventors: Qingfeng Tang, Novi, MI (US); Riad Ghabra, Dearborn Heights, MI (US); John S. Nantz, Brighton, MI (US); Matthew Honkanen, Royal Oak, MI (US); Ronald O. King, Brownstown, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/027,627

(22) Filed: Dec. 21, 2001

(65) Prior Publication Data

US 2003/0117293 A1 Jun. 26, 2003

(51) Int. Cl.7 .............................................. G08G 1/123
(52) U.S. Cl. ................. 340/989; 340/825.31; 340/542; 340/825.69; 340/825.72; 340/5.61; 340/5.62; 70/257; 70/278
(58) Field of Search ............................ 340/989, 825.31, 340/542, 825.69, 825.72, 5.61, 5.62; 70/257, 278

(56) References Cited

U.S. PATENT DOCUMENTS

| | | | |
|---|---|---|---|
| 3,688,256 A | | 8/1972 | D'Ausilio et al. |
| 4,688,036 A | * | 8/1987 | Hirano et al. ............... 340/5.62 |
| 5,047,962 A | * | 9/1991 | Cornish ....................... 702/187 |
| 5,532,709 A | | 7/1996 | Talty |
| 5,613,214 A | * | 3/1997 | Shirasawa et al. ........... 455/411 |
| 5,640,146 A | | 6/1997 | Campana, Jr. |
| 5,682,133 A | | 10/1997 | Johnson et al. |
| 5,710,548 A | | 1/1998 | LeMense |
| 5,940,003 A | | 8/1999 | Schulz |
| 6,005,490 A | * | 12/1999 | Higashihara ............ 340/825.72 |
| 6,028,537 A | | 2/2000 | Suman et al. |
| 6,037,859 A | | 3/2000 | Flick |
| 6,075,454 A | * | 6/2000 | Yamasaki ................... 340/5.61 |
| 6,130,622 A | * | 10/2000 | Hussey et al. .............. 340/5.61 |
| 6,243,022 B1 | * | 6/2001 | Furukawa ............... 340/825.72 |
| 6,624,758 B1 | * | 9/2003 | Omata et al. ........... 340/825.69 |

* cited by examiner

Primary Examiner—Daniel J. Wu
Assistant Examiner—Tai T. Nguyen
(74) Attorney, Agent, or Firm—Bill C. Panagos

(57) ABSTRACT

A system for providing vehicle location information or confirmation of remote entry system operation to a user. In one embodiment, a vehicle transceiver receives a wireless vehicle device function signal, and a vehicle controller generates a vehicle device control signal for use in operating a vehicle device in response. The vehicle controller also confirms operation of the vehicle device, and the vehicle transceiver transmits a wireless vehicle device function confirmation signal. A remote unit includes a transceiver for operation by the user for transmitting the vehicle device function signal and for receiving the vehicle device function confirmation signal. The remote unit also includes an indicator for providing an indication to the user confirming operation of the vehicle device, and a storage device for storing retrievable data representing the indication confirming operation of the vehicle device.

10 Claims, 3 Drawing Sheets

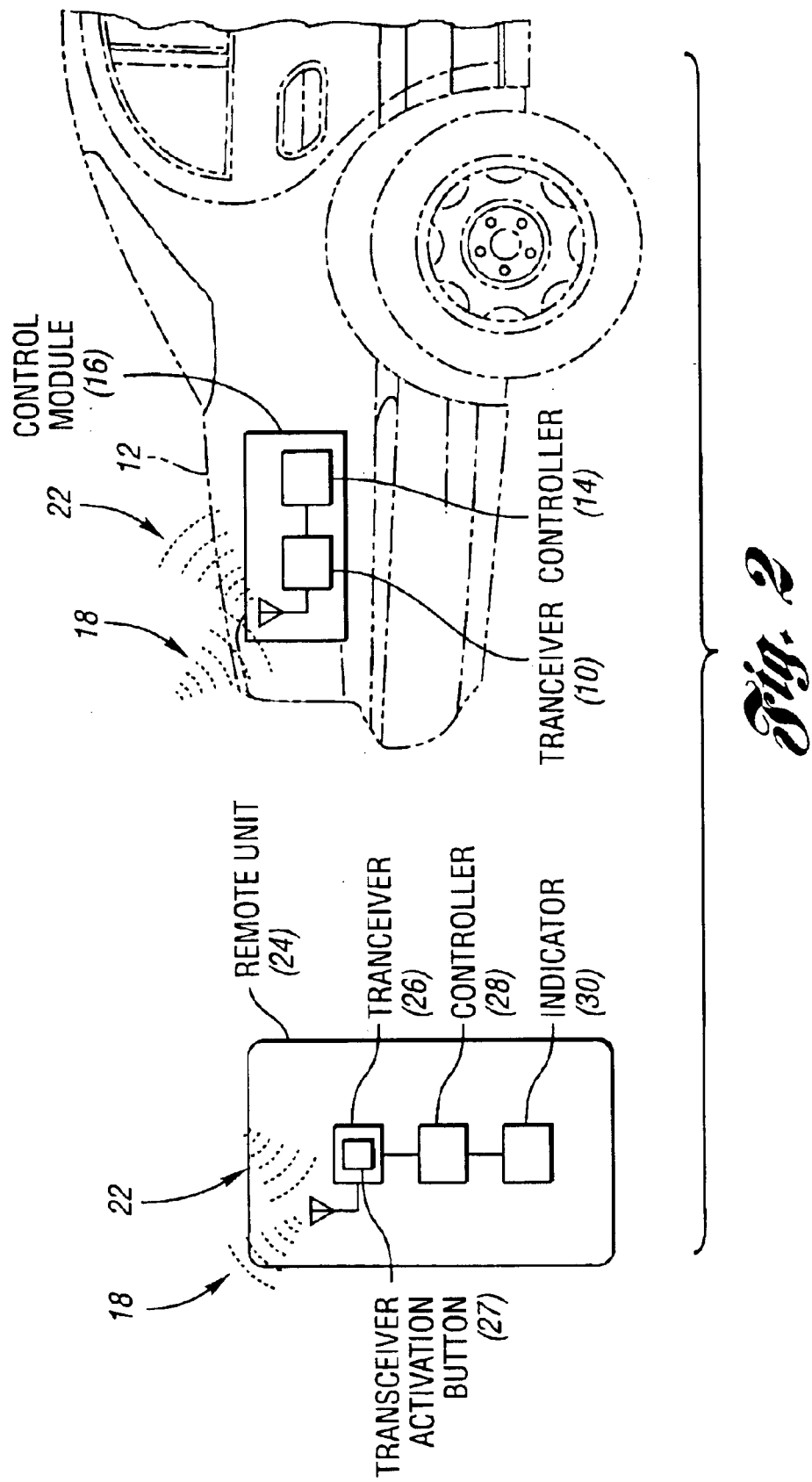

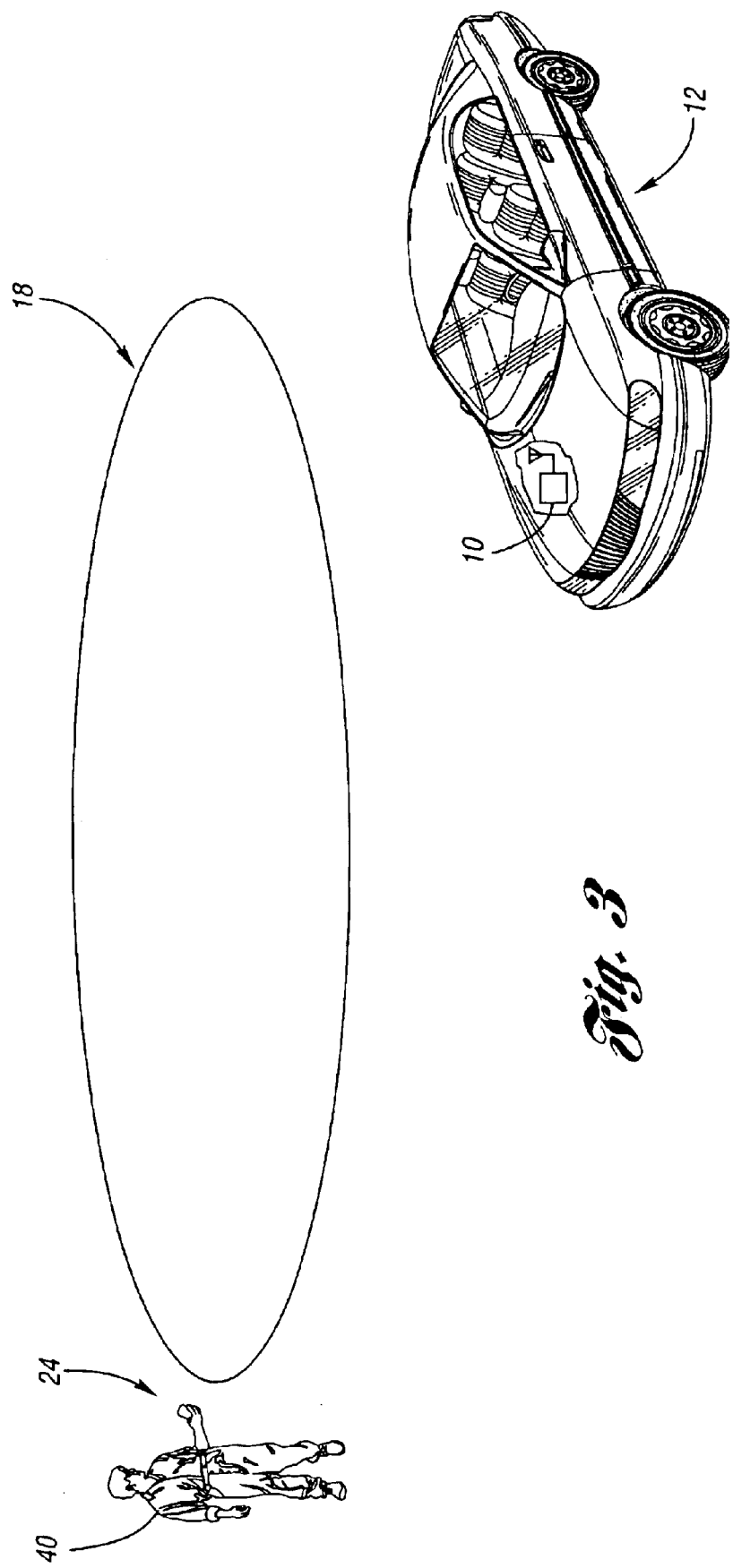

REMOTE SYSTEM FOR PROVIDING VEHICLE INFORMATION TO A USER

BACKGROUND OF THE INVENTION

1. Field of the Invention

The present invention relates to a system for remotely providing vehicle location or vehicle device information to a user.

2. Background

Remote keyless entry systems for use with motor vehicles are well known in the art. Such systems typically include at least one remote control device, which typically takes the form of a key fob. The key fob includes a wireless transmitter for use by the vehicle owner or user to transmit wireless, usually radio frequency (RF), vehicle device function signals, and includes a number of vehicle function buttons for use in transmitting such signals. A receiver and controller are typically provided in the vehicle for receiving the vehicle device function signals and controlling one or more vehicle devices in order to effect the desired vehicle function.

Vehicle devices which may be remotely controlled in such a fashion may include door lock mechanisms, automatic doors, a vehicle trunk, interior and/or exterior vehicle lights, a vehicle horn, or a vehicle alarm. In that regard, transmission of vehicle device function signals may effect locking or unlocking of a vehicle door, closing or opening a vehicle door, opening a vehicle trunk, activating interior and/or exterior vehicle lights, or activating a vehicle horn or alarm.

In such remote keyless entry systems, it is known to use a vehicle horn and/or exterior lights, such as headlamps, to aid in locating the vehicle. In that regard, for example, a key fob may be provided with a vehicle locator button specifically for use in locating the vehicle. Activation by the vehicle owner or user of the vehicle locator button on the key fob causes transmission of a signal that, when received at the vehicle, may cause the vehicle horn to sound or the vehicle headlamps to flash a number of times to help the vehicle owner or user locate the vehicle, such as in a crowded parking lot or garage.

It is also known to use a vehicle horn and/or exterior lights in such remote keyless entry systems to provide feedback to the vehicle owner or user concerning the success of a requested vehicle function, or to provide an alarm for use in the event of an emergency. In that regard, a first activation by a user of a vehicle door lock button on a key fob may, for example, cause transmission of a vehicle device function signal for use in locking the vehicle doors. Within a short time after that first activation, a second activation by the user of the vehicle door look button may cause transmission of a signal that in turn causes the vehicle horn to sound or the vehicle headlamps to flash in order to immediately confirm for the user that the vehicle doors have been successfully locked. A key fob may also include an alarm button, activation of which by the vehicle owner or user causes transmission of a signal that in turn causes the vehicle horn and/or a separate vehicle alarm to sound repeatedly, and may also cause the vehicle headlamps to flash repeatedly. While not necessarily intended by manufacturers to help locate a vehicle, such confirmation and/or alarm functions of a key fob may also be used for vehicle location by a vehicle owner or user.

However, using remote keyless entry systems to locate a vehicle as described above may be ineffective and/or undesirable. More specifically, flashing exterior vehicle lights may not be noticeable during daylight hours, and a horn may not be perceptible in high noise areas. Still further, flashing lights and/or a sounding horn or alarm may also compromise the security of a vehicle owner or user, as the location of the vehicle may also be provided to others.

Moreover, after leaving the vicinity of a vehicle, the vehicle owner or user may become uncertain as to whether, for example, the vehicle doors were locked. In that event, if the user is no longer within the range of the key fob transmitter, the user is unable to confirm that a vehicle function, such a door locking operation, was successfully undertaken.

Thus, there exists a need for an improved system for providing vehicle location information to a vehicle owner or user. Such a system would overcome the above-described problems associated with prior art remote entry system vehicle location functions. Such a system would preferably use a remote unit, such as a key fob, to provide a vehicle user with an indication of a directional location of the vehicle relative to the remote unit, preferably based on the signal strength of a wireless vehicle locator signal transmitted from the remote unit.

There also exists a need for an improved system for providing vehicle device information to a vehicle owner or user. Such a system would overcome the above-described problems associated with confirmation of vehicle device operations in prior art remote keyless entry systems. Such a system would preferably use a remote unit, such as a key fob, to provide a vehicle user with confirmation of the operation of a vehicle device, preferably using an indicator, such as a display, on the remote unit.

SUMMARY OF THE INVENTION

Accordingly, an object of the present invention is to provide a system for remotely providing vehicle location or vehicle device information to a user.

According to the present invention, then, in a remote entry system for a vehicle, a system is provided for providing confirmation of remote entry system operation to a user. The system comprises a first transceiver to be located in the vehicle for receiving a wireless vehicle device function signal, a first controller to be located in the vehicle and to be provided in communication with the first transceiver, the first controller for generating a vehicle device control signal for use in operating a vehicle device in response to the vehicle device function signal and for confirming operation of the vehicle device, wherein the first transceiver transmits a wireless vehicle device function confirmation signal, and a remote unit. The remote unit comprises a second transceiver having a transceiver activation button for operation by the user, the second transceiver for transmitting the vehicle device function signal in response to operation of the transceiver activation button by the user, and for receiving the vehicle device function confirmation signal, and a second controller in communication with the second transceiver for generating an indicator control signal in response to the vehicle device function confirmation signal. The remote unit further comprises an indicator in communication with the second controller for receiving the indicator control signal and providing an indication to the user in response thereto, the indication confirming operation of the vehicle device, and a storage device in communication with the second controller, the storage device for storing data representing the indication confirming operation of the vehicle device, the data being retrievable by the user.

According to the present invention, a system is also provided for providing vehicle location information to a user. The system comprises a first transceiver to be located in the vehicle for receiving a wireless vehicle locator signal, and a first controller to be located in the vehicle and to be provided in communication with the first transceiver, the first controller for determining a signal strength of the vehicle locator signal, wherein the first transceiver transmits a wireless vehicle directional signal when a maximum signal strength of the vehicle locator signal is determined, and a remote unit. The remote unit comprises a second transceiver for transmitting the vehicle locator signal, and for receiving the vehicle directional signal, a second controller in communication with the second transceiver for generating an indicator control signal in response to the vehicle directional signal, and an indicator in communication with the second controller for receiving the indicator control signal and providing an indication to the user in response thereto of a directional location of the vehicle relative to the remote unit.

The preferred embodiments of the present invention are set forth in the following detailed descriptions thereof, including the accompanying drawings.

BRIEF DESCRIPTION OF THE DRAWINGS

FIG. 2 is a simplified, exemplary block diagram including another embodiment of the present invention; and FIG. 3 is a simplified, exemplary environmental diagram including the present invention.

DETAILED DESCRIPTION OF THE PREFERRED EMBODIMENT(S)

Figure 1:
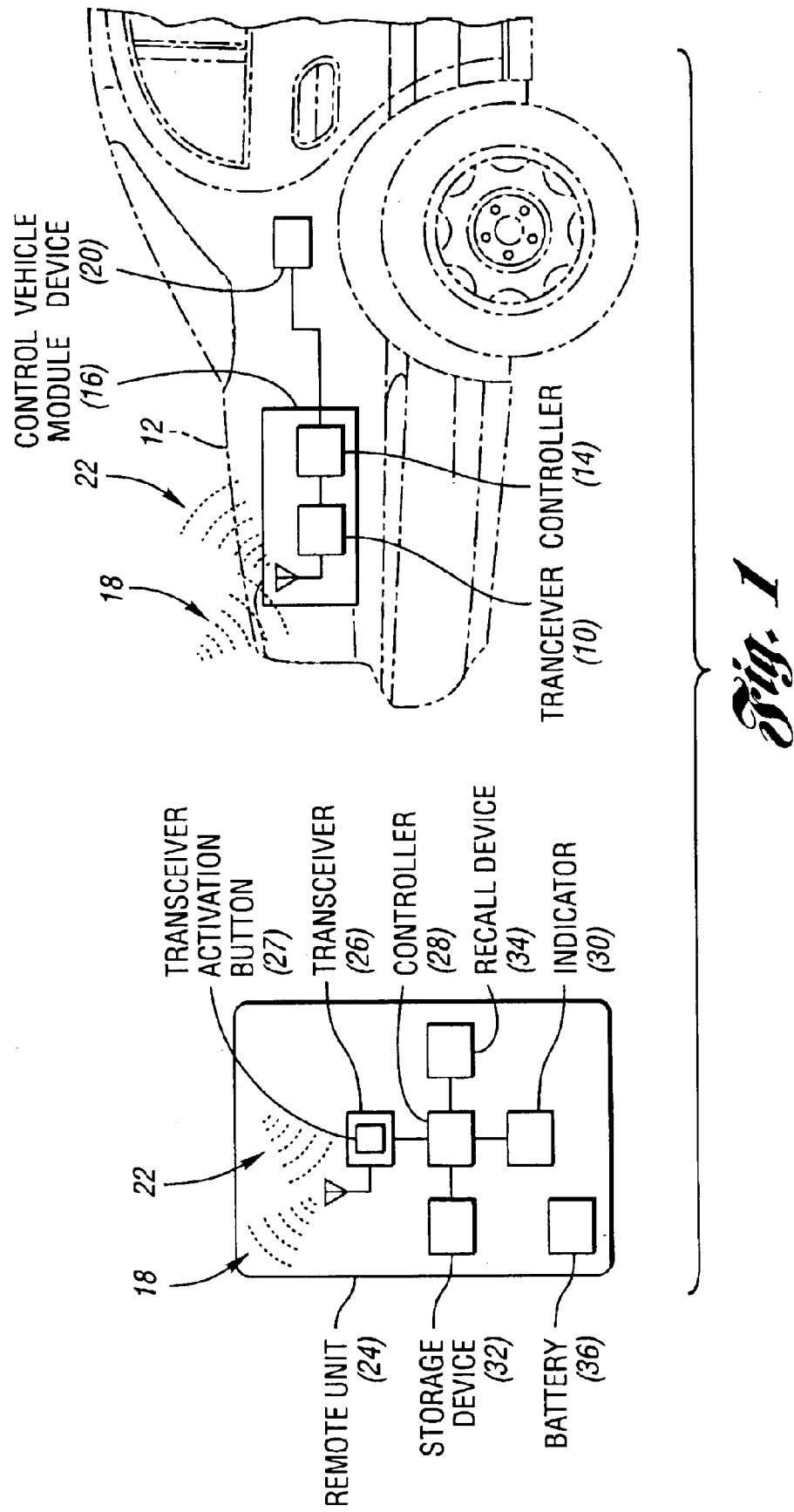
FIG. 1 is a simplified, exemplary block diagram including one embodiment of the present invention.

Referring now to the Figures, the preferred embodiments of the present invention will now be described in detail. As previously noted, remote keyless entry systems for use with motor vehicles are well known in the art. Such systems typically include at least one remote control device, which typically takes the form of a key fob. The key fob includes a wireless transmitter for use by the vehicle owner or user to transmit wireless, usually RF, vehicle device function signals, and includes a number of vehicle function buttons for use in transmitting such signals. A receiver and controller are typically provided in the vehicle for receiving the vehicle device function signals and controlling one or more vehicle devices in order to effect the desired vehicle function.

Vehicle devices which may be remotely controlled in such a fashion may include door lock mechanisms, automatic doors, a vehicle trunk, interior and/or exterior vehicle lights, a vehicle horn, or a vehicle alarm. In that regard, transmission of vehicle device function signals may effect locking or unlocking of a vehicle door, closing or opening a vehicle door, opening a vehicle trunk, activating interior and/or exterior vehicle lights, or activating a vehicle horn or alarm.

As also described previously, in such remote keyless entry systems, it is known to use a vehicle horn and/or exterior lights, such as headlamps, to aid in locating the vehicle. In that regard, for example, a key fob may be provided with a vehicle locator button specifically for use in locating the vehicle. Activation by the vehicle owner or user of the vehicle locator button on the key fob causes transmission of a signal that, when received at the vehicle, may cause the vehicle horn to sound or the vehicle headlamps to flash a number of times to help the vehicle owner or user locate the vehicle, such as in a crowded parking lot or garage.

It is also known to use a vehicle horn and/or exterior lights in such remote keyless entry systems to provide feedback to the vehicle owner or user concerning the success of a requested vehicle function, or to provide an alarm for use in the event of an emergency. In that regard, a first activation by a user of a vehicle door lock button on a key fob may, for example, cause transmission of a signal for use in locking the vehicle doors. Within a short time after that first activation, a second activation by the user of the vehicle door look button may cause transmission of a signal that in turn causes the vehicle horn to sound or the vehicle headlamps to flash in order to immediately confirm for the user that the vehicle doors have been successfully locked. A key fob may also include an alarm button, activation of which by the vehicle owner or user causes transmission of a signal that in turn causes the vehicle horn and/or a separate vehicle alarm to sound repeatedly, and may also cause the vehicle headlamps to flash repeatedly. While not necessarily intended by manufacturers to help locate a vehicle, such confirmation and/or alarm functions of a key fob may also be used for such a purpose by a vehicle owner or user.

However, as previously described, using remote keyless entry systems to locate a vehicle as described above may be ineffective and/or undesirable. More specifically, flashing exterior vehicle lights may not be noticeable during daylight hours, and a horn may not be perceptible in high noise areas. Still further, flashing lights and/or a sounding horn or alarm may also compromise the security of a vehicle owner or user, as the location of the vehicle may also be provided to others.

Moreover, as also previously described, after leaving the vicinity of a vehicle, the vehicle owner or user may become uncertain as to whether, for example, the vehicle doors were locked. In that event, if the user is no longer within the range of the key fob transmitter, the user is unable to confirm that a vehicle function, such a door locking operation, was successfully undertaken.

Thus, there exists a need for an improved system for providing vehicle location information to a vehicle owner or user. Such a system would overcome the above-described problems associated with prior art remote entry system vehicle location functions. Such a system would preferably use a remote unit, such as a key fob, to provide a vehicle user with an indication of a directional location of the vehicle relative to the remote unit, preferably based on the signal strength of a wireless vehicle locator signal transmitted from the remote unit.

There also exists a need for an improved system for providing vehicle device information to a vehicle owner or user. Such a system would overcome the above-described problems associated with confirmation of vehicle device operations in prior art remote keyless entry systems. Such a system would preferably use a remote unit, such as a key fob, to provide a vehicle user with confirmation of the operation of a vehicle device, preferably using an indicator, such as a display, on the remote unit.

Referring now to FIG. 1, a simplified, exemplary block diagram including one embodiment of the present invention is shown in a remote entry system for a vehicle. As seen therein, the system of the present invention comprises a transceiver (10) located in a vehicle (12). Vehicle transceiver (10) is provided in communication with a controller (14), also located in vehicle (12). Vehicle transceiver (10) and vehicle controller (14) may both be part of a vehicle control module (16).

Vehicle transceiver (10) is for receiving a wireless vehicle device function signal (18). Vehicle controller (14) is for generating a vehicle device control signal not shown) for use in operating a vehicle device (20) in response to receipt of vehicle device function signal (18) by vehicle transceiver (10). As previously described, vehicle device (20, could be a vehicle door lock mechanism, a vehicle trunk, an automatic vehicle door, interior and/or exterior vehicle lights, a vehicle horn, a vehicle alarm, or other vehicle device. In that regard, vehicle device function signal (18) may be a door lock mechanism function (lock or unlock), a vehicle trunk function (trunk unlock), an automatic door function (door open or door close), vehicle light functions (on or off), a vehicle horn function (on or off), a vehicle alarm function (on or off), or any other type of function. Vehicle controller (14) is also for confirming operation of vehicle device (20) in response to the vehicle device control signal. Upon such confirmation, vehicle transceiver (10) transmits a wireless vehicle device function confirmation signal (22).

Referring still to FIG. 1, the system further comprises a remote unit (24). Although not necessary, remote unit (24) is preferably part of a key fob for use in a vehicle remote entry system. Remote unit (24) comprises a transceiver (26), a controller (28), an indicator (30), a storage device (32), a recall device (34), and a battery (36). Transceiver (26) has a transceiver activation button (27) for operation by a user (not shown). Transceiver (26) is for transmitting vehicle device function signal (18) in response to operation of the transceiver activation button (27) by the user, and for receiving vehicle device function confirmation signal (22) from vehicle transceiver (10).

Transceiver (26) is provided in communication with controller (28), which is itself provided in communication with indicator (30). Controller is for generating an indicator control signal (not shown) in response to receipt of vehicle device function confirmation signal (22) by transceiver (26). Indicator (30) is for receiving the indicator control signal and providing an indication to the user in response confirming operation of vehicle device (20). In that regard, indicator (30) is preferably a display, such as a liquid crystal display (LCD), although any other type of indicator could be used, such as a light emitting diode (LED). Where indicator (30) comprises a display, the indication to the user confirming operation of vehicle device (20) could be a text confirmation message provided on the display. In any event, such an indication confirming operation of vehicle device (20) may be, for example, an indication that a vehicle door is locked or unlocked, that the vehicle trunk is open or closed, or that an automatic vehicle door is open or closed.

Still referring to FIG. 1, storage device (32) is for storing data representing the indication confirming operation of vehicle device (20), such as the previously described confirmation message. Such data is retrievable from storage device (32) by the user, using recall device (34). In that regard, storage device (32) is preferably a random access memory (RAM), and recall device (34) is at least one switch or button on remote unit (24) for activation by the user to access storage device (32) for retrieval of such data.

As is well known in the art, battery (36) provides electrical power for operation of transceiver (26), controller (28), indicator (30), storage device (32), and recall device (34), and should be suitable for same. In that regard, to help conserve the electrical power of battery (36), transceiver (26) is preferably operable for receiving vehicle device function confirmation signal (22) only for a short predetermined time period after operation of transceiver activation button (27) by the user.

In such a fashion, even after leaving the vicinity of vehicle (12), a vehicle owner or user who has become uncertain can confirm, for example, whether the vehicle doors were locked. That is, according to the present invention, even outside the range of transceiver (26) of remote unit (24), the user can confirm whether a door locking operation was successfully undertaken by using recall device (34) and storage device (32) to check the status of the vehicle door lock mechanism.

Referring now to FIG. 2, a simplified, exemplary block diagram including another embodiment of the present invention is shown. In this embodiment, the system comprises many of the same components depicted in FIG. 1, which components are depicted in FIG. 2 using like numerals. As seen in FIG. 2, the system of the present invention is for providing vehicle location information to a user and comprises a transceiver (10) located in a vehicle (12). Vehicle transceiver (10) is provided in communication with a controller (14), also located in vehicle (12). Vehicle transceiver (10) and vehicle controller (14) may both be part of a vehicle control module (16).

Vehicle transceiver (10) is for receiving a wireless vehicle locator signal (18). Vehicle controller (14) is for determining a signal strength of vehicle locator signal (18). In that regard, controller (14) preferably comprises a microprocessor including a received signal strength indicator (RSSI). The RSSI output is proportional to the vehicle locator signal (18) received by vehicle transceiver (10). In that regard, as the strength of wireless vehicle locator signal (18) increases or decreases, there is a corresponding increase or decrease in DC voltage present at the RSSI output. Vehicle transceiver (10) transmits a wireless vehicle directional signal (22) when a maximum signal strength of the vehicle locator signal (18) is determined. That is, by using the DC voltage at the RSSI output, vehicle transceiver (10) can transmit vehicle directional signal (22) indicating when a maximum signal strength of vehicle locator signal (18) was sampled.

Referring still to FIG. 2, the system further comprises a remote unit (24). In that regard, remote unit (24) may be part of a key fob for use in a vehicle remote entry system. Remote unit (24) comprises a transceiver (26), a controller (28), and an indicator (30). Transceiver (26) may be provided with a transceiver activation button (27) for operation by a user (not shown). Transceiver (26) is for transmitting vehicle locator signal (18), such as in response to operation of transceiver activation button (27) by the user, and for receiving vehicle directional signal (22) from vehicle transceiver (10).

Transceiver (26) is provided in communication with controller (28), which is itself provided in communication with indicator (30). Controller (28) is for generating an indicator control signal (not shown) in response to receipt of vehicle directional signal (22) by transceiver (26). Indicator (30) is for receiving the indicator control signal and providing an indication to the user in response of a directional location of vehicle (12) relative to remote unit (24). In that regard, indicator (30) is preferably a lamp, such as in the shape of an arrow, illuminated by a light emitting diode (LED). Alternatively, a display, such as a liquid crystal display (LCD) could be used. Where indicator (30) comprises a display, the indication to the user of a directional location of vehicle (12) relative to remote unit (24) could be a directional arrow provided on the display.

Controller (28) may also determine a signal strength of vehicle directional signal (22) received by transceiver (26). In that regard, controller (28) preferably comprises a microprocessor including a received signal strength indicator (RSSI). Once again, the RSSI output is proportional to vehicle directional signal (22) received by transceiver (26). As the strength of wireless vehicle directional signal (22) increases, there is a corresponding increase in DC voltage present at the RSSI output. By using the DC voltage at the RSSI output, controller (28) can determine the strength of vehicle directional signal (22), and indicator (30) can provide an indication of a distance between vehicle (12) and remote unit (24) based on the determined signal strength of vehicle directional signal (22). In that regard, where indicator (30) comprises a display, the indication of a distance between vehicle (12) and remote unit (24) may be numeric information provided on the display.

Referring next to FIG. 3, a simplified, exemplary environmental diagram of the present invention is shown, depicting the car location feature thereof. Once again, like numerals are used in FIG. 3 to depict the same components previously depicted in FIG. 2. As seen in FIG. 3, a remote unit (24) includes a transceiver (not shown), which transmits vehicle locator signal (18) in a directed pattern. User (40) points remote unit (24), and thus the transceiver, and turns until indicator (not shown) on remote unit (24), such as an arrow, lights up indicating the direction in which vehicle (12) lies relative to remote unit (24). As previously described, vehicle (12) is provided with vehicle transceiver (10) and vehicle controller (not shown), which receive and measure the energy of vehicle locator signal (18) using an RSSI output, or by other suitable means of measuring energy or strength of wireless (preferably RF) vehicle locator signal (18).

In that regard, when user (40) initiates the car location function, the transceiver (not shown) in remote unit (24) starts to send data (i.e., vehicle locator signal (18)) to the transceiver (10) in vehicle (12). Because of the directed pattern of vehicle locator signal (18), as the user (40) holding remote unit (24) begins to turn, the signal strength measured by the vehicle controller (not shown) at the RSSI output will be highest once the user (40) is pointed directly at vehicle (12). As the different power levels present at the vehicle (12) are measured, the vehicle transceiver (10) transmits back to the transceiver (not shown) of remote unit (24), which then indicates from what direction the highest power level was received. As previously discussed, an LED (not shown) or any other type of indicator may be used on remote unit (24) to show direction.

As is readily apparent from the foregoing detailed description, the present invention provides a system for remotely providing vehicle location or vehicle device information to a user. In one embodiment, the present invention provides an improved system for providing vehicle location information to a user that overcomes the previously described problems associated with prior art remote entry system vehicle location functions. The system includes a remote unit, such as a key fob, to provide a vehicle user with an indication of a directional location of the vehicle relative to the remote unit based on the signal strength of a wireless vehicle locator signal transmitted from the remote unit. In another embodiment, the present invention provides an improved system for providing vehicle device information to a user that overcomes the previously described problems associated with confirmation of vehicle device operations in prior art remote keyless entry systems. The system includes a remote unit, such as a key fob, to provide a user with confirmation of the operation of a vehicle device using an indicator, such as a display, on the remote unit.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a remote entry system for a vehicle, a system for providing confirmation of remote entry system operation to a user comprising:
   a first transceiver to be located in the vehicle for receiving a wireless vehicle device function signal;
   a first controller to be located in the vehicle and to be provided in communication with the first transceiver, the first controller for generating a vehicle device control signal for use in operating a vehicle device in response to the vehicle device function signal and for confirming operation of the vehicle device, wherein the first transceiver transmits a wireless vehicle device function confirmation signal; and
   a remote unit comprising,
      a second transceiver having a transceiver activation button for operation by the user, the second transceiver for transmitting the vehicle device function signal in response to operation of the transceiver activation button by the user, and for receiving the vehicle device function confirmation signal,
      a second controller in communication with the second transceiver for generating an indicator control signal in response to the vehicle device function confirmation signal,
      an indicator in communication with the second controller for receiving the indicator control signal and providing an indication to the user in response thereto, the indication confirming operation of the vehicle device, and
      a storage device in communication with the second controller, the storage device for storing data representing the indication confirming operation of the vehicle device, the data being retrievable by the user.

2. The system of claim 1 wherein the remote unit further comprises a battery for providing electrical power and, to conserve electrical power, the second transceiver is operable for receiving the vehicle device function confirmation signal for a predetermined time period after operation of the transceiver activation button by the user.

3. The system of claim 1 wherein the remote unit further comprises a recall device, wherein, in response to operation of the recall device by the user, the data is retrieved from the storage device and the indicator provides the indication confirming operation of the vehicle device to the user.

4. The system of claim 1 wherein the indicator comprises a display.

5. The system of claim 1 wherein the vehicle device comprises a door lock mechanism, and the vehicle device function signal comprises a door lock mechanism function.

6. The system of claim 5 wherein the indication comprises a door locked indication.

7. The system of claim 5 wherein the indication comprises a door unlocked indication.

8. The system of claim 1 wherein the vehicle device comprises a vehicle trunk, and the vehicle device function signal comprises a vehicle trunk function.

9. The system of claim 8 wherein the indication comprises a vehicle trunk open indication.

10. The system of claim 8 wherein the indication comprises a vehicle trunk closed indication.

* * * * *

UNITED STATES PATENT AND TRADEMARK OFFICE
CERTIFICATE OF CORRECTION

PATENT NO. : 6,724,322 B2
DATED : April 20, 2004
INVENTOR(S) : Qingfeng Tang et al.

It is certified that error appears in the above-identified patent and that said Letters Patent is hereby corrected as shown below:

<u>Title page,</u>
Item [75], Inventors, please delete "; Ronald O. King, Brownstown, MI (US)"

Signed and Sealed this

Fourteenth Day of September, 2004

JON W. DUDAS
*Director of the United States Patent and Trademark Office*